US012767065B2

(12) United States Patent
Moriya et al.

(10) Patent No.: US 12,767,065 B2
(45) Date of Patent: Oct. 20, 2026

(54) EMBLEM FOR VEHICLE WITH BUILT-IN HEATER AND MANUFACTURING METHOD THEREOF

(71) Applicants: Nanbu Plastics Co., Ltd., Shizuoka (JP); Elephantech Inc., Tokyo (JP)

(72) Inventors: Sigekazu Moriya, Shizuoka (JP); Shoki Sano, Shizuoka (JP); Junichi Ueyama, Shizuoka (JP); Shinya Shimizu, Tokyo (JP); Takashi Nakashima, Tokyo (JP)

(73) Assignees: Nanbu Plastics Co., Ltd., Shizuoka (JP); Elephantech Inc., Tokyo (JP)

( * ) Notice: Subject to any disclaimer, the term of this patent is extended or adjusted under 35 U.S.C. 154(b) by 61 days.

(21) Appl. No.: 18/287,019

(22) PCT Filed: Mar. 30, 2022

(86) PCT No.: PCT/JP2022/016095
§ 371 (c)(1),
(2) Date: Oct. 16, 2023

(87) PCT Pub. No.: WO2022/224774
PCT Pub. Date: Oct. 27, 2022

(65) Prior Publication Data

US 2024/0198928 A1 Jun. 20, 2024

(30) Foreign Application Priority Data

Apr. 19, 2021 (JP) ................................ 2021-070622

(51) Int. Cl.
*B60R 13/00* (2006.01)
*G01S 7/40* (2006.01)
*G01S 13/931* (2020.01)

(52) U.S. Cl.
CPC .......... *B60R 13/005* (2013.01); *G01S 7/4043* (2021.05); *G01S 13/931* (2013.01)

(58) Field of Classification Search
CPC ............. B60R 13/005; B60R 2013/016; G01S 7/4043; G01S 7/027; G01S 7/4047;
(Continued)

(56) References Cited

U.S. PATENT DOCUMENTS

2004/0113899 A1* 6/2004 Nakayama .............. B32B 27/06
2019/0232886 A1* 8/2019 Okumura ............... H01Q 1/422
(Continued)

FOREIGN PATENT DOCUMENTS

DE 102014214329 A1 * 1/2016 ............. B29C 45/14
FR 3075720 A1 * 6/2019
(Continued)

OTHER PUBLICATIONS

"International Search Report (Form PCT/ISA/210) of PCT/JP2022/016095", mailed on Jun. 21, 2022, with English translation thereof, pp. 1-4.

(Continued)

*Primary Examiner* — Ellis B. Ramirez
(74) *Attorney, Agent, or Firm* — JCIPRNET

(57) ABSTRACT

Provided are an emblem for a vehicle with a built-in heater and a method for manufacturing the same in which it is possible to prevent breakage of a heater element and to reduce deterioration even in a configuration in which a heater layer is shaped (deformed) together with a decorative layer having a three-dimensional shape. The emblem, having electromagnetic wave permeability, for a vehicle with a built-in heater comprises: a decorative film; a circuit film on which a heater element is disposed; a first cushion layer disposed between the back surface of the decorative film and the front surface of the circuit film; a second cushion layer disposed on the back surface of the circuit film; a transparent front base material disposed on the front surface of the
(Continued)

decorative film; and a rear base material disposed on the back surface of the circuit film.

16 Claims, 8 Drawing Sheets

(58) Field of Classification Search
CPC ............ G01S 13/931; H05B 2203/003; H05B 2203/013; H05B 2203/017; H05B 2214/02; H05B 3/286; B29C 45/14811; B29C 45/14688; B29C 2045/14704; H01Q 1/3283; H01Q 1/3233; H01Q 1/42
USPC ............... 701/301; 343/872, 704; 219/465.1, 219/466.1; 336/84 C; 342/53, 54, 56; 367/127
See application file for complete search history.

(56) References Cited

U.S. PATENT DOCUMENTS

| | | | | |
|---|---|---|---|---|
| 2020/0371203 | A1* | 11/2020 | Hirotani ................ | B60R 13/005 |
| 2022/0209401 | A1* | 6/2022 | Hong ..................... | H01Q 1/422 |

FOREIGN PATENT DOCUMENTS

| | | | | |
|---|---|---|---|---|
| JP | 2017215243 A | * 12/2017 | ........... | B60R 13/005 |
| JP | 2018066705 | 4/2018 | | |
| JP | 2018066706 | 4/2018 | | |
| JP | 6652031 | 2/2020 | | |
| JP | 2020044869 | 3/2020 | | |
| JP | 2020152132 | 9/2020 | | |
| JP | 2020176895 | 10/2020 | | |
| JP | 2020176895 A | * 10/2020 | | |
| JP | 2021043019 | 3/2021 | | |

OTHER PUBLICATIONS

"Written Opinion of the International Searching Authority (Form PCT/ISA/237) of PCT/JP2022/016095," mailed on Jun. 21, 2022, with English translation thereof, pp. 1-6.
"Search Report of Europe Counterpart Application", issued on Sep. 18, 2024, p. 1-p. 9.
"Office Action of China Counterpart Application No. 202280024481.2", issued on Aug. 22, 2026, with English translation thereof, p. 1-p. 17.

* cited by examiner

EMBLEM FOR VEHICLE WITH BUILT-IN HEATER AND MANUFACTURING METHOD THEREOF

CROSS-REFERENCE TO RELATED APPLICATION

This application is a 371 application of International PCT application serial no. PCT/JP2022/016095, filed on Mar. 30, 2022, which claims the priority benefit of Japan application no. 2021-070622, filed on Apr. 19, 2021. The entirety of each of the above-mentioned patent applications is hereby incorporated by reference herein and made a part of this specification.

TECHNICAL FIELD

The present invention relates to an emblem for a vehicle with a built-in heater having electromagnetic wave permeability and a method for manufacturing the same.

BACKGROUND ART

In a case where a millimeter wave radar generator is disposed on a back surface side of an emblem to be mounted on a vehicle for various types of driving support such as autonomous driving, it is required that millimeter waves pass through the emblem without problems for a radar to function. In addition, since millimeter waves are attenuated by the influence of snow adhering to the emblem, it has been proposed to build a heater in the emblem for the purpose of melting snow in order to maintain performance.

For example, in a decorative component for a vehicle and a manufacturing method thereof described in Patent Literature 1, a configuration in which a main part including a heating element of a heater portion built in a decorative component for a vehicle is sandwiched between a front base material and a rear base material for the purpose of improving transmission performance of millimeter waves while suppressing intrusion of water is disclosed. In this configuration, when a front base material having a convex portion protruding forward is molded using a resin material, a depression due to a sink mark occurs at a location behind the convex portion. In view of the fact that a void portion occurring between the depression and the main part of the heater portion reduces millimeter wave transmission performance, this void portion is filled with a part of the base material or the same resin material as the base material. More specifically, a transparent member having a concave portion in a rear portion is formed by injection molding, and a decorative layer located on a front surface of the front base material is formed by printing a colored layer on the transparent member and vapor-depositing a metal layer thereon.

In Patent Literature 2, a radome for a vehicle-mounted radar device and a method for manufacturing the same in which it is possible to ensure good visibility of a decorative layer, improve electromagnetic wave permeability, and reliably melt snow adhering to the outer surface of the radome with high heat conduction efficiency are disclosed. Specifically, a transparent front base material having electromagnetic wave permeability, a decorative layer, and a heater layer are provided in close contact with each other in that order from a surface side. The decorative layer is formed to partially protrude to the surface side to follow a first concave portion on a back surface side of the front base material, and the heater layer is provided to partially protrude to the surface side to follow a second concave portion on a back surface side of the decorative layer provided at a position corresponding to the first concave portion.

In Patent Literature 3, a technology for preventing a heater element from being damaged in a case where a rear base material is formed by injection molding on a back surface side of a heater layer by forming a protective film to cover the heater element from the back surface side in a method for manufacturing a radome for a vehicle-mounted radar device having the same configuration as the radome for a vehicle-mounted radar device of Patent Literature 2 is disclosed.

CITATION LIST

Patent Literature

[Patent Literature 1]
Japanese Unexamined Patent Application Publication No. 2018-66706
[Patent Literature 2]
Japanese Unexamined Patent Application Publication No. 2020-176895
[Patent Literature 3]
Japanese Unexamined Patent Application Publication No. 2021-43019

SUMMARY OF INVENTION

Technical Problem

In the technology of Patent Literature 1, the reason why the void portion occurs is that the front base material (the resin) is insert-molded in the back surface of a decorative portion having an uneven shape, and it is desirable to realize a structure of an emblem and a manufacturing method in which such a void portion does not occur. In addition, it requires multiple molding steps such as injection molding of the transparent member, insert molding of the front base material, two-color molding of a connection portion, and insert molding of the rear base material, and there is room for improvement in manufacturing labor and costs.

According to the technology of Patent Literature 2, the decorative layer and the heater layer are provided in close contact with each other without providing the void portion or the base material between the decorative layer and the heater layer, and thus the efficiency of heat conduction from the heater layer to the surface of the front base material is enhanced, and the number of molding steps is reduced. However, since the decorative layer is formed to partially protrude to the surface side to follow the first concave portion on the back surface side of the front base material, and the heater layer is provided to partially protrude to the surface side to follow the second concave portion on the back surface side of the decorative layer provided at the position corresponding to the first concave portion (that is, the decorative layer and the heater layer are brought into close contact with each other and are deformed into a convex shape to follow the concave portion of the front base material), stress is applied to the heater element disposed in the heater layer, and there is a possibility of breakage or deterioration of the heater element.

In Patent Literature 3, the protective film that covers the heater element from the back surface side is mainly intended to protect the surface of the heater element in a case where the rear base material is formed on the back surface side of the heater layer by injection molding, and it does not prevent breakage or deterioration of the heater element due to bending of the heater layer caused by three-dimensional deformation of the heater layer. In particular, in Patent Literature 2 and 3, the heater layer is deformed to come into close contact with the concave portion of the transparent front base material. Specifically, before the molding step of the rear base material, an insulating film to which the heater element is fixed is deformed by air pressure molding to closely follow the uneven shape on the back surface side of the front base material. As a result, the heater element is deformed (elongated) into substantially the same shape as the concave portion of the front base material and receives excessive elongation stress depending on the shape and depth of the concave portion, and thus breakage or deterioration of the heater element may occur.

The present invention has been made against such a background, and an objective of the present invention is to provide an emblem for a vehicle with a built-in heater and a method for manufacturing the same in which it is possible to prevent breakage of a heater element and to reduce deterioration even in a configuration in which a heater layer is shaped (deformed) together with a decorative layer having a three-dimensional shape.

Solution to Problem

According to the present invention, there is provided an emblem for a vehicle with a built-in heater having electromagnetic wave permeability, including: a decorative film; a circuit film on which a heater element is disposed; a first cushion layer disposed between a back surface of the decorative film and a front surface of the circuit film; a second cushion layer disposed on a back surface of the circuit film; a transparent front base material disposed on a front surface of the decorative film; and a rear base material disposed on the back surface of the circuit film.

According to this configuration, the circuit film having the heater element disposed thereon is sandwiched between the first cushion layer and the second cushion layer. As a result, the first and second cushion layers reduce stress applied to the heater element of the circuit film.

The circuit film may be constituted by a film-like resin member and the heater element disposed on the film-like resin member. As a result, a film-like heater layer is obtained.

A stacked body of at least the decorative film, the first cushion layer, and the circuit film may have a convex portion partially protruding forward from the emblem on a front plane of the emblem. As a result, the decorative film can be formed into a three-dimensional shape integrally with the circuit film and the first cushion layer.

As one aspect, a wiring pattern of the heater element may be disposed over substantially the entire area of the circuit film including the inside of an area of the convex portion. In this case, due to the presence of the first and second cushion layers in the area behind the convex portion, the degree of deformation of the heater element is reduced.

In this configuration, the heater element may be disposed in a meandering shape at least inside the area of the convex portion. As a result, the stress on the heater element is further reduced when the circuit film is stretched.

In another aspect, a wiring pattern of the heater element may be disposed avoiding an area of the convex portion. As a result, deformation of the heater element is avoided in the area behind the convex portion.

In the emblem for a vehicle with a built-in heater, a colored layer may be provided on the back surface of the decorative film. As a result, a design property of the decorative film is enhanced and the heater element of the wiring layer of the circuit film behind it is prevented from being seen from the front (seen through).

The first cushion layer may be printed, coated, or dyed in a predetermined opaque color. As a result, even in a case where the colored layer is not present on the back surface of the decorative film, the wiring of the heater element behind it is prevented from being seen from the front (seen through).

The second cushion layer may be printed, coated, or dyed in a predetermined opaque color. As a result, in a case where all the layers behind the second cushion layer are transparent, it is possible to enhance a design property of the bright film (and thus the decorative film) from behind the emblem and to prevent the heater element of the wiring layer of the circuit film behind it from being seen through.

The rear base material may be printed, coated, or dyed in a predetermined opaque color. As a result, for example, when the rear base material is a dark color such as black, navy blue, or gray, it is possible to change a design property by influencing the color of the back surface of the emblem. Further, it also contributes to enhancing a design property of the bright film (and thus the decorative film) from behind the emblem and preventing the heater element of the wiring layer of the circuit film behind it from being seen through.

The first and second cushion layers may be constituted by an adhesive layer formed of an adhesive. This adhesive layer has both adhesiveness and elasticity for bonding between layers and thus contributes to simplification of the manufacturing process.

In a case where the second cushion layer is formed of an adhesive, the emblem for a vehicle may further include a film-like resin layer interposed between the second cushion layer and the rear base material. This film-like resin layer functions as a cover covering the rear surface of the second cushion layer having adhesiveness.

In the emblem for a vehicle with a built-in heater according to any one of the aspects described above, the decorative film may be constituted by a bright film. As a result, it is possible to express metallic luster without using a metal and to have electromagnetic wave permeability.

The second cushion layer may be thicker than the first cushion layer. As a result, the heat generated from the circuit film can be quickly and efficiently transmitted to the front side of the emblem.

According to the present invention, there is provided a method for manufacturing an emblem for a vehicle with a built-in heater having electromagnetic wave permeability, including: a step of bonding a front surface of a circuit film having a heater element on a back surface thereof and a back surface of a decorative film to each other with a first cushion layer; a step of providing a second cushion layer on the back surface of the circuit film; a step of providing a transparent resin layer as a front base material on a front surface of the decorative film; and a step of providing a rear base material on a back surface side of the second cushion layer.

The method for manufacturing an emblem for a vehicle with a built-in heater may further include a step of shaping a stacked body of at least the decorative film, the first cushion layer, and the circuit film to have a convex portion partially protruding forward from the emblem on a front plane of the emblem. As a result, the stacked body can have a three-dimensional shape.

In the method for manufacturing an emblem for a vehicle with a built-in heater, the first and second cushion layers may be constituted by an adhesive layer formed of an adhesive. This adhesive layer has both adhesiveness and elasticity for bonding between layers and thus contributes to simplification of the manufacturing process.

The method for manufacturing an emblem for a vehicle with a built-in heater may further include a step of allowing a film-like resin layer to be interposed between the second cushion layer and the rear base material. As a result, the rear surface of the second cushion layer having adhesiveness can be covered with the film-like resin layer, and the production efficiency can be improved.

Advantageous Effects of Invention

According to the emblem for a vehicle with a built-in heater and the method for manufacturing the same of the present invention, it is possible to prevent breakage of the heater element and to reduce deterioration even in a configuration in which the heater layer is shaped (deformed) together with the decorative layer having a three-dimensional shape.

DESCRIPTION OF EMBODIMENTS

Hereinafter, embodiments of the present invention will be described in detail with reference to the accompanying drawings.

Configuration of Emblem for Vehicle

Figure 1:
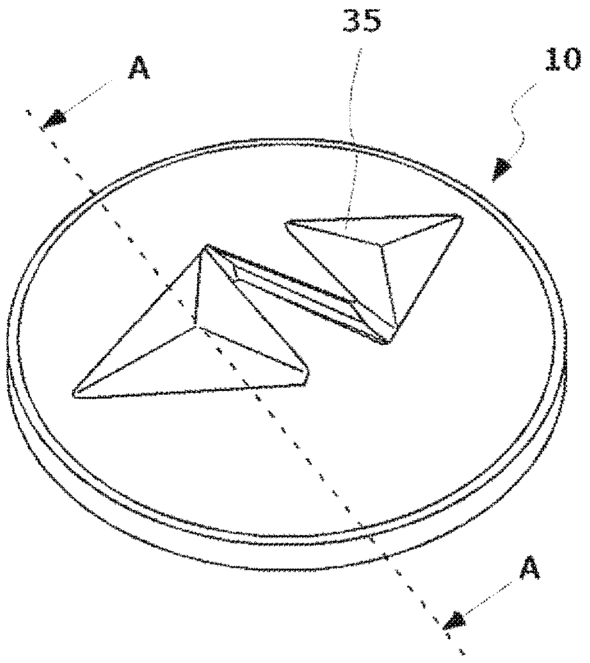
FIG. 1 is a perspective view showing the appearance of a main part of an emblem for a vehicle with a built-in heater according to the present embodiment.

FIG. 1 is a perspective view showing the appearance of a main part of an emblem 10 for a vehicle with a built-in heater according to the present embodiment. Hereinafter, the emblem for a vehicle with a built-in heater is also simply referred to as an emblem for a vehicle or an emblem.

The emblem 10 for a vehicle has a substantially disk-like shape and has a convex portion 35 partially protruding forward from the emblem on a front surface of the emblem (a plane on a front side of the emblem when the emblem is mounted on the vehicle). The front surface of the emblem has a decorative portion, which is a so-called decorative layer, in which the design of the emblem 10 for a vehicle is elaborated. This decorative layer generally has a three-dimensional shape peculiar to the emblem in order to enhance its effect. Normally, the front surface of the emblem 10 for a vehicle is covered with a transparent resin material such that the three-dimensional shape inside can be seen therethrough. In this specification, the term "transparent" means transmission of visible light, includes semi-transparency, and says nothing about whether it is colorless or colored.

Further, the decorative layer shown in the emblem 10 of FIG. 1 may be partially colored as necessary.

Figure 2:
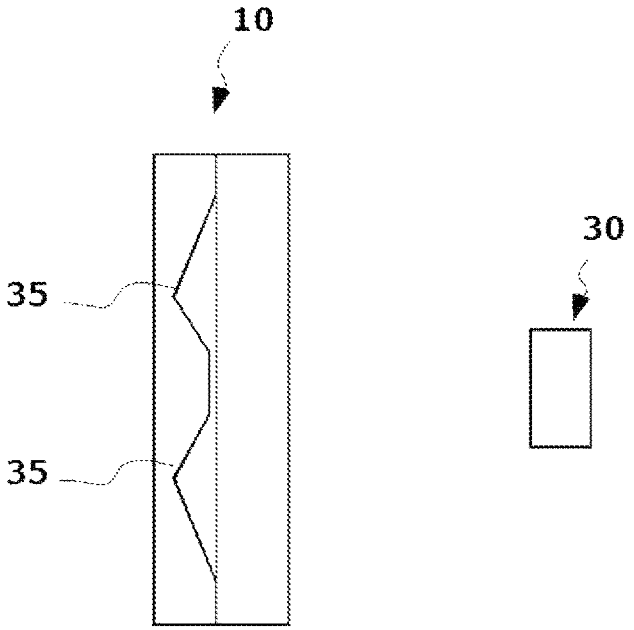
FIG. 2 is a schematic side view of the emblem for a vehicle with a built-in heater according to the present embodiment when the emblem is mounted on the vehicle.

FIG. 2 shows a schematic side view of the emblem 10 for a vehicle when the emblem 10 for a vehicle is mounted on the vehicle. A millimeter wave radar generator 30 that emits electromagnetic waves, particularly millimeter waves, forward from the emblem is disposed on the back surface of the emblem 10 for a vehicle for various types of driving support such as automatic driving. Therefore, (each layer of) the emblem 10 for a vehicle has electromagnetic wave permeability (millimeter wave permeability) such that its presence does not hinder the progress of millimeter waves.

Further, since millimeter waves are attenuated by the influence of snow adhering to the emblem 10 for a vehicle, a heater as a heat generating means is built in the emblem 10 for a vehicle for the purpose of melting the snow.

Figure 3:
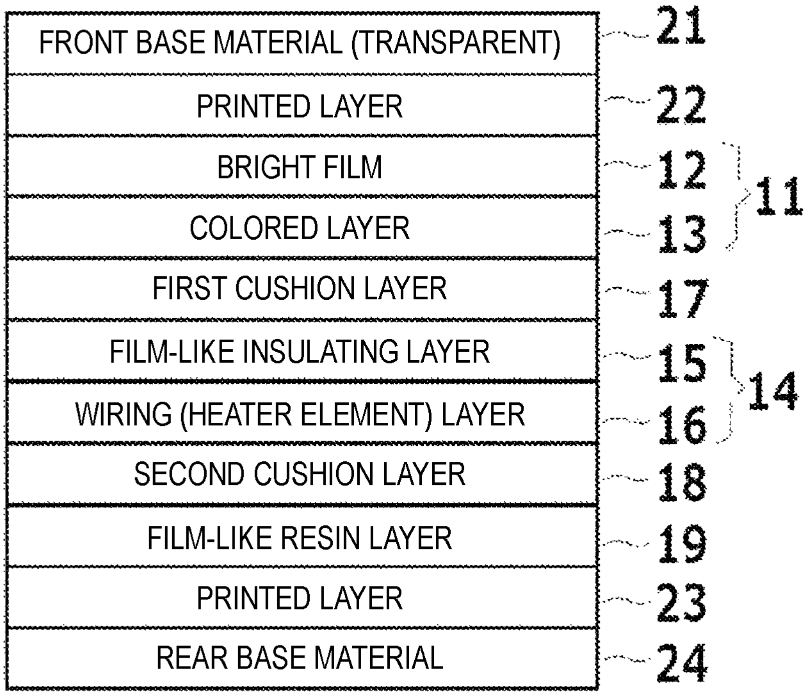
FIG. 3 is a view showing a layer structure of the emblem for a vehicle with a built-in heater according to the present embodiment.

FIG. 3 shows a layer structure of the emblem 10 for a vehicle according to the present embodiment. This emblem 10 for a vehicle includes a front base material 21, a printed layer 22, a bright film 12, a colored layer 13, a first cushion layer 17, a film-like insulating layer 15, a wiring (heater element) layer 16, a second cushion layer 18, a film-like resin layer 19, a printed layer 23, and a rear base material 24 in that order from the upper portion of the figure which is the front surface of the emblem.

The front base material 21 is formed of a transparent resin. The material of this resin is a synthetic resin such as polycarbonate (PC). In addition to the PC, synthetic resins, for example, acryl such as polymethyl methacrylate (PMMA), acrylonitrile-butadiene-styrene (ABS), polyethylene terephthalate (PET), polyethylene (PE), polypropylene (PP), acrylonitrile-styrene (AS), polystyrene (PS), and cycloolefin polymer (COP) may be used. The thickness of the front base material 21 is about 1.0 to 10.0 mm, more preferably about 2.0 to 6.0 mm.

The printed layer 22 is a layer of ink or paint of any color and functions as a binder layer when the front base material is molded. For example, in addition to applying ink as a transparent layer to the entire surface, ink of a specific color (for example, blue) is applied in a pattern for the design of the emblem 10 for a vehicle. This ink layer of a specific color is not required. The thickness of the printed layer 22 is about 1.0 to 15.0 μm, more preferably about 2.0 to 8.0 μm.

The bright film 12 is a member that constitutes the decorative film 11 as a decorative layer in the present embodiment. The bright film 12 is a film (a nano-stacked film) that expresses metallic luster without using a metal by using a nano-stacking technology and has electromagnetic wave permeability. For example, Picasus (registered trademark) manufactured by Toray Industries, Inc. is known. In the present embodiment, such a bright film 12 is used as the decorative film 11. Although the thickness of the bright film 12 is not particularly limited, it is about 150 μm in this example. Typically, it is about 50.0 to 700.0 μm, more preferably about 100 to 600 μm.

In the present embodiment, the colored layer 13 is provided on the rear surface (the back surface) of the bright film 12. The colored layer 13 is a specific color, preferably a dark opaque color such as black, navy blue, or gray and functions to enhance a design property of the bright film 12 (and thus the decorative film 11) and to prevent the heater element of the wiring layer 16 of the circuit film 14 behind it from being seen from the front (seen through). The colored layer 13 is applied to the bright film 12 by screen printing, coating, or the like with ink. In the present embodiment, the bright film 12 and the colored layer 13 constitute the decorative film 11 together. The thickness of the colored layer 13 is about 1.0 to 15.0 μm, more preferably about 2.0 to 8.0 μm.

The first cushion layer 17 is a layer disposed between the back surface of the decorative film 11 and the front surface of the circuit film 14, which will be described later, and is an adhesive layer formed of an adhesive in the present embodiment. The first cushion layer 17 is transparent in this embodiment, but may optionally be printed, coated, or dyed in a predetermined opaque color. In this specification, the term "cushion layer" refers to a layer interposed between the circuit film 14 and another layer in order to prevent breakage or deterioration of the heater element of the wiring layer 16 of the circuit film 14 and a layer that functions to reduce the stress or load applied to the heater element, in other words, a layer that functions to reduce the degree of deformation when the circuit film 14 is subjected to a shaping force.

Although the thickness of the first cushion layer 17 is not particularly limited, it is, for example, about 25 μm. Typically, it is about 5.0 to 100.0 μm, more preferably about 10.0 to 80.0 μm. If the thickness is too thick, there may be shaping problems such as not being able to obtain the desired shape during shaping which will be described later, or moldability problems during injection molding, and on the other hand, if the thickness is too thin, it is not be effective as a cushion. Therefore, it is desirable to select an appropriate thickness according to the three-dimensional shape and structure of the emblem 10 for a vehicle.

The "adhesive" is a semi-solid and viscous material that can be adhered to the surface to which it is attached with only a small amount of pressure and is a material that always maintains a stable wet state. Here, an example in which an adhesive sheet made of silicone optical clear adhesive (OCA: a highly transparent adhesive sheet), which is a silicone adhesive, is used as the first cushion layer 17 is shown.

The decorative film 11 and the circuit film 14 are bonded to each other through the adhesive layer as the first cushion layer 17.

Examples of the adhesive include a urethane adhesive, an acrylic adhesive, and the like in addition to the silicone adhesive.

Further, it is conceivable that various elastomers or rubbers are used as the first cushion layer 17 in addition to the adhesives. In a case where the elastomers or rubbers are used, an adhesive may be used together to impart adhesiveness.

The film-like insulating layer 15 is formed of a resin material such as polyethylene terephthalate (PET) or polyimide (PI), and the wiring layer 16 as the heater element is disposed on one surface (the rear surface in this example) of the film-like insulating layer 15 to constitute the circuit film 14. Examples of another candidate material for the film-like insulating layer 15 include polycarbonate (PC), polypropylene (PP), acrylonitrile-butadiene-styrene (ABS), an alloy material of polycarbonate and ABS (PC-ABS), crystalline polymer (LCP), and the like. Although the thickness of the film-like insulating layer 15 is not particularly limited, it is about 125 μm. Typically, it is 10 to 200.0 μm, more preferably about 20.0 to 150.0 μm. Although the thickness of the wiring layer 16 is not particularly limited, it is about 4 μm in this example. Typically, it is about 2.0 to 25.0 μm, more preferably about 2.0 to 20.0 μm.

The second cushion layer 18 is disposed on the back surface of the circuit film 14. The second cushion layer 18 can be formed of the same material as the first cushion layer 17. However, the thickness of the second cushion layer 18 is preferably thicker than that of the first cushion layer 17, and although it is not particularly limited, it is about 50 μm in this example. Typically, it is about 5.0 to 100.0 μm, more preferably about 10.0 to 80.0 μm.

The second cushion layer 18 may be transparent, or may optionally be printed, coated, or dyed in a predetermined opaque color. In a case where the second cushion layer 18 is opaque, even if all the layers behind it are transparent, it is possible to enhance a design property of the bright film 12 (and thus the decorative film 11) from behind the emblem and to prevent the heater element of the wiring layer 16 of the circuit film 14 behind it from being seen through.

At least the second cushion layer 18 has a heat insulating effect and is expected to have the effect of reducing heat generated by the wiring layer 16 from escaping to the rear side (the back surface) of the emblem. On the other hand, it is required to transfer the heat to the front side of the emblem more quickly and efficiently. This is because, normally, the front surface of the emblem 10 for a vehicle is exposed to the outside, and thus snow or the like adheres to it, but the back surface is embedded in the grille, bonnet, or the like not to be exposed to the outside air, and thus it is not expected that snow or the like adheres to it. From this point of view, in a case where the same material is used for the first cushion layer 17 and the second cushion layer 18, the thickness of the second cushion layer 18 is at least equal to the thickness of the first cushion layer 17, or preferably greater than the thickness of the first cushion layer 17.

The film-like resin layer 19 is disposed behind the second cushion layer 18. This film-like resin layer 19 can be constituted by, for example, a polyethylene terephthalate (PET) layer and functions as a cover that covers the sticky surface in a case where the second cushion layer 18 is formed of an adhesive layer. Examples of another material for the film-like resin layer 19 include polyimide (PI), polycarbonate (PC), polypropylene (PP), acrylonitrile-butadiene-styrene (ABS), an alloy material of polycarbonate and ABS (PC-ABS), crystalline polymer (LCP), acryl such as polymethyl methacrylate (PMMA), polyurethane (PU), cycloolefin polymer (COP), and the like. Although the thickness of the film-like resin layer 19 is not particularly limited, it is about 50 μm, for example. Typically, it is about 10.0 to 200.0 μm, more preferably about 20.0 to 150.0 μm.

In a case where the second cushion layer 18 is formed of a material such as an elastomer instead of an adhesive, an adhesive layer of the adhesive is provided on the front surface side of the second cushion layer 18, but the adhesive layer is not provided on the rear surface side of the second cushion layer 18, and thus the film-like resin layer 19 can be omitted.

A rear base material 24 is disposed on the rear surface of the second cushion layer 18 (and the film-like resin layer 19) with the printed layer 23 interposed therebetween. The rear base material 24 constitutes the base of the emblem 10 for a vehicle and can be provided with, for example, an attachment portion (not shown) as a means for attaching the rear base material 24 to the vehicle.

The rear base material 24 can be made of a synthetic resin such as polycarbonate (PC) or acrylonitrile-butadiene-styrene (ABS). In addition, synthetic resins, for example, acrylonitrile-ethylene-styrene (AES), acryl such as polymethyl methacrylate (PMMA), and acrylate-styrene-acrylonitrile (ASA) can also be used. The thickness of the rear base material 24 is typically about 0.2 to 10.0 mm, more preferably about 1.0 to 6.0 mm. The rear base material 24 may optionally be transparent, or printed, coated, or dyed in a predetermined opaque color.

The printed layer 23 is screen-printed (solidly coated) with ink (or paint) of a predetermined color (for example, white) and functions as a binder layer when the rear base material 24 is molded. The thickness of the printed layer 23 is typically about 1.0 to 15.0 μm, more preferably about 2.0 to 8.0 μm. Further, in a case where the rear base material 24 is transparent, the printed layer 23 determines the color of the back surface of the emblem 10 for a vehicle. Even in a case where the rear base material 24 is a dark color such as black, navy blue, or gray, the color of the printed layer 23 may cause differences in the color of the back surface of the emblem 10 for a vehicle. Further, it also contributes to enhancing a design property of the bright film 12 (and thus the decorative film 11) from behind the emblem and preventing the heater element of the wiring layer 16 of the circuit film 14 behind it from being seen through.

Figure 4:
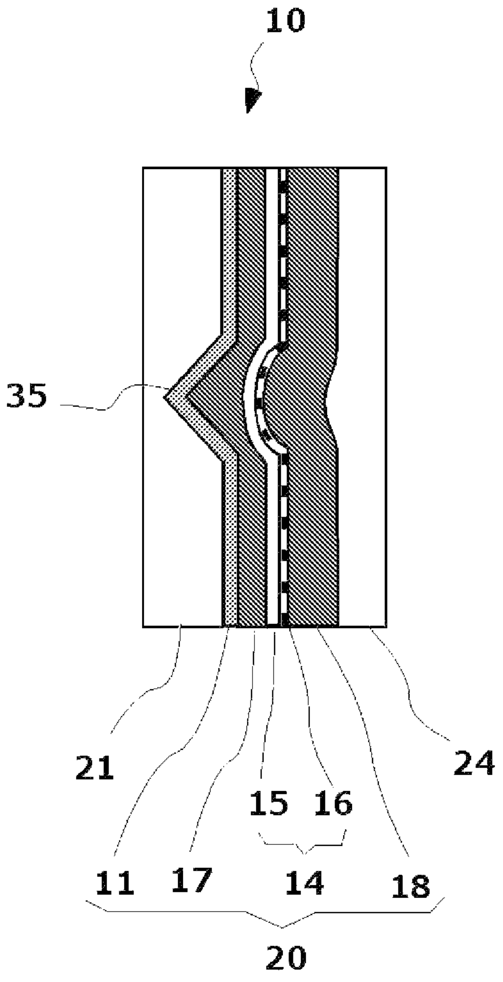
FIG. 4 is a view showing a schematic cross-sectional view of the emblem for a vehicle with a built-in heater according to the present embodiment.

FIG. 4 shows a schematic cross-sectional view of the emblem 10 for a vehicle according to the present embodiment. This cross-sectional view corresponds to a cross-sectional view along line A-A of the emblem 10 for a vehicle shown in FIG. 1. As can be seen from this figure, at least a stacked body 20 of the decorative film 11, the first cushion layer 17, and the circuit film 14 (and here, the second cushion layer 18) has the convex portion 35 partially protruding forward from the emblem. This convex portion 35 presents a predetermined three-dimensional shape that is created as a result of shaping the stacked body 20.

Generally, a step of injecting a synthetic resin with respect to a film to integrate them with each other is called a film insert step. At that time, in order to conform a shape of the film to concave and convex portions of a mold, the film is formed into that shape in advance in another step. As a method for that purpose, a step such as vacuum molding or air pressure molding, in which heat or pressure is applied, is performed. At that time, the circuit film 14 is partially stretched and deformed. In the example of FIG. 4, after the stacked body 20 is shaped, the molding of the front base material 21 and the molding of the rear base material 24 are performed.

As can be seen from FIG. 4, the decorative film 11 that is a most front surface of the stacked body 20 is shaped to conform to the desired three-dimensional shape, but due to the presence of the first cushion layer 17 (and the second cushion layer 18) behind it, the bending degree of the circuit film 14 and thus the heater element of the wiring layer 16 thereof is reduced in comparison with that of the decorative film 11. In other words, in the cross-sectional view, with respect to the bent shape of the decorative film 11, the circuit film 14 does not follow the shape of the decorative film 11 completely and is gently curved.

As a result, breakage or deterioration of the heater element due to the shaping is effectively prevented. In addition, it is possible to prevent the occurrence of so-called wiring floating in which the circuit film 14 does not follow the uneven shape of the decorative film 11 sufficiently and a gap occurs between the two in a case where the cushion layer 17 is not present.

Further, in the present embodiment, since the decorative film 11 is used as a decorative portion, a step of vapor deposition of a metal or the like in the known Literature 1 is not required for forming the decorative portion.

Furthermore, in the present embodiment, by adopting a configuration in which the cushion layer 17 is sandwiched between the two film-like members of the decorative film 11 and the circuit film 14, a step of insert-molding the front base material (a resin) on the back surface of the decorative portion having an uneven shape as in the known Literature 1 is not necessary, and thus the void portion, which is problematic in the same literature, does not occur.

The refractive indices of the above-described materials of the first cushion layer 17 and the second cushion layer 18 are closer to the refractive indices of the front base material 21 and the rear base material 24 than that of the void portion and are considered to have little influence on the permeability of the electromagnetic waves (the millimeter waves).

Figure 5:
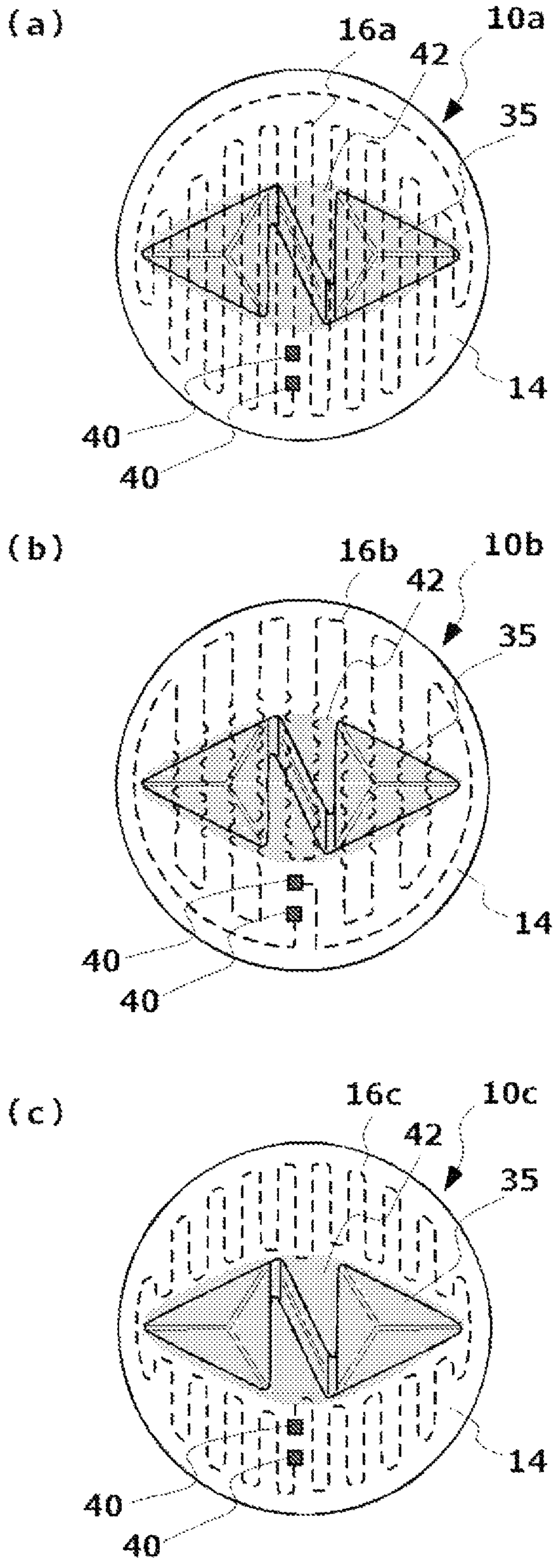
FIG. 5 is an explanatory view of a wiring pattern of a heater element of the emblem for a vehicle with a built-in heater according to the present embodiment.

A wiring pattern of the heater element of the wiring layer 16 of the circuit film 14 according to the present embodiment will be described with reference to FIG. 5. FIG. 5. (a), (b), and (c) show front views of emblems 10*a*, 10*b*, and 10*c* for a vehicle having different wiring patterns.

The wiring pattern of the heater element of a wiring layer 16*a* of an emblem 10*a* for a vehicle shown in FIG. 5(*a*) is disposed over substantially the entire area of the circuit film 14 including the inside of an area 42 of the convex portion 35 (shown filled in gray for convenience in the figure). This configuration corresponds to the configuration in FIG. 4, and since the heater element is located closer to the surface of the convex portion 35 in the area 42, it can be expected that the surface temperature on the front side of the emblem will rise faster (become higher).

The heater element of a wiring layer 16*b* of an emblem 10*b* for a vehicle shown in FIG. 5. (b) is disposed in a meandering shape at least inside the area 42 of the convex portion 35. With this configuration, even if the circuit film 14 is stretched during shaping, the extensional stress on the heater element is reduced. The effect of locating the heater element closer to the surface of the convex portion 35 in the area 42 can be expected as in the case of FIG. 5(*a*).

The heater element of a wiring layer 16*c* of an emblem 10*c* for a vehicle shown in FIG. 5. (c) is disposed to avoid at least the area 42 of the convex portion 35. In this case, since the heater element is present only outside the area 42, the influence of deformation during shaping is small, but the stress during injection molding of the front base material 21 or the rear base material 24 is also applied to a portion other than the convex portion 35, and thus the effect of preventing breakage or deterioration of the heater element can be expected.

Figure 6:
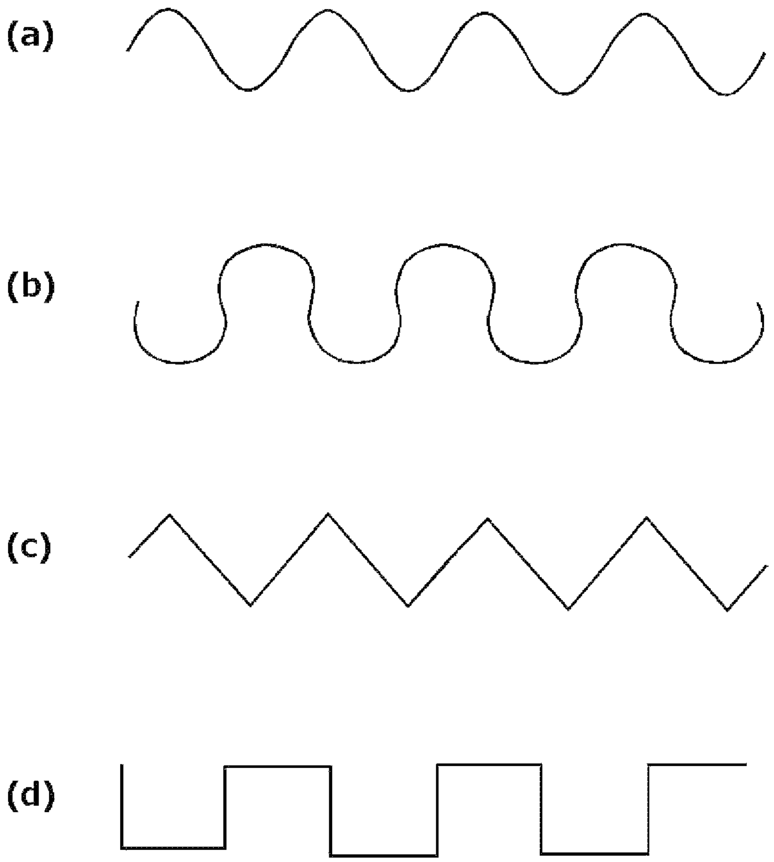
FIG. 6, (a) to (d) are views showing modification examples of a meandering shape of the heater element of the emblem for a vehicle with a built-in heater according to the present embodiment.

FIG. 6(*a*) to (*d*) show modification examples of the meandering shape of the heater element. FIG. 6. (a) shows a sinusoidal shape as a typical meandering shape as shown in FIG. 5. (b). FIG. 6. (b) shows a horseshoe shape as another example of the meandering shape. FIG. 6. (c) shows a triangular wave shape as another example of the meandering shape. FIG. 6. (d) shows a square wave shape as another example of the meandering shape. In this specification, in addition to these shapes, any shape in which the heater element moves forward while moving left and right with respect to the direction of travel, without extending the heater element in a straight line from one point to another point shall be included in the "meandering" shape.

Method for Manufacturing Emblem for Vehicle

Next, a method for manufacturing the emblem 10 for a vehicle with a built-in heater having electromagnetic wave permeability according to the present embodiment will be described.

Figure 7:
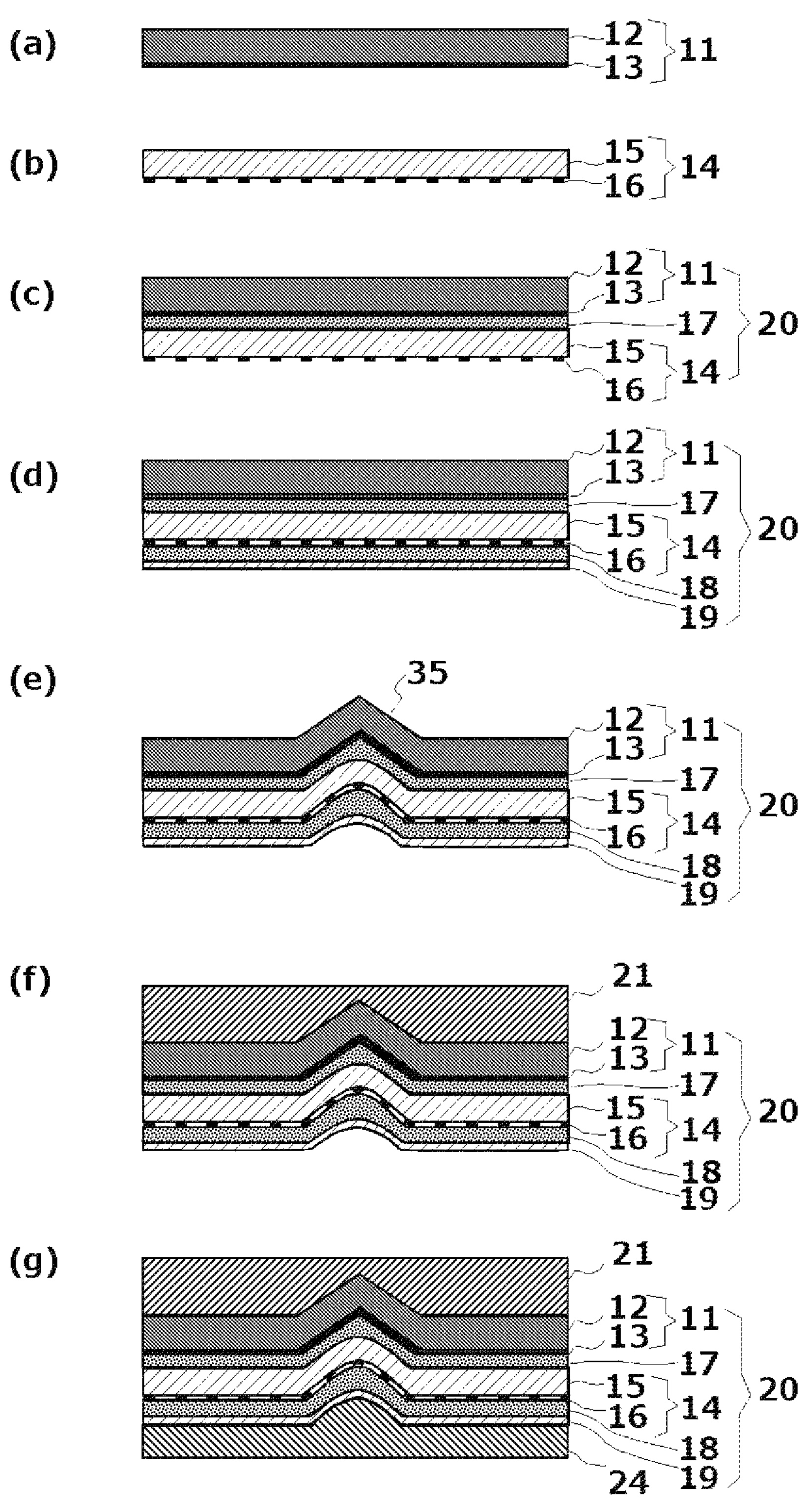
FIG. 7 is an explanatory view of a plurality of steps executed in a method for manufacturing the emblem for a vehicle with a built-in heater according to the present embodiment.

FIG. 7 shows a schematic cross-sectional view of the layer structure of the emblem 10 for a vehicle corresponding to each step as an explanatory view of a plurality of steps executed in this manufacturing method. The upper side of this figure corresponds to the front side of the emblem.

First, in the step of FIG. 7(*a*), the colored layer 13 described above is formed on one surface (the rear surface in this example) of the bright film 12 by screen printing, coating, or the like with ink of a predetermined color.

In the step of FIG. 7(*b*), the wiring layer 16 for the heater element is formed on one surface (the rear surface in this example) of the film-like insulating layer 15 such as a PET film. In one example of the method, for example, ink containing nano metal particles is printed in the form of a wiring pattern by an inkjet method, the ink pattern is baked, and the metal layer of the ink pattern is reinforced by electrolytic/non-electrolytic plating to form the wiring layer 16. However, the method of forming the wiring layer 16 is not limited to this, and other methods may be used.

The order of the steps in FIG. 7. (a) and (b) may be reversed. Alternatively, the resulting product of each step may be obtained and used.

Next, as shown in FIG. 7. (c), a step of bonding the front surface of the circuit film 14 and the back surface of the decorative film 11 to each other with the first cushion layer 17 is performed. If the first cushion layer 17 is a sheet type adhesive layer, the first cushion layer 17 is used as it is, and if the first cushion layer 17 is not an adhesive layer, an adhesive or the like is applied to both sides of the first cushion layer 17 for use.

In the subsequent step of FIG. 7(*d*), the second cushion layer 18 is provided on the back surface of the circuit film 14. If the second cushion layer 18 is a sheet-like adhesive layer, the adhesive layer is bonded to the back surface of the circuit film 14. If the second cushion layer 18 is not an adhesive layer, the second cushion layer 18 is joined to the back surface of the circuit film 14 with an adhesive or the like.

A synthetic resin film such as a PET film as the film-like resin layer 19 is attached to the rear surface of the second cushion layer 18. If the second cushion layer 18 is not an adhesive layer, the attachment of the film-like resin layer 19 may be omitted.

After that, as shown in FIG. 7(*e*), a step of shaping the stacked body 20 (FIG. 7(*d*)) obtained by stacking the decorative film 11, the first cushion layer 17, the circuit film 14, the second cushion layer 18, and the film-like resin layer 19 to have the convex portion 35 partially protruding forward from the emblem on a front plane of the emblem is performed. For shaping in this step, a molding method (a shaping method) such as vacuum molding or air pressure molding can be used.

Next, as shown in FIG. 7(*f*), a step of providing a transparent resin layer (for example, the synthetic resin layer such as the polycarbonate described above) as the front base material 21 on the front surface of the decorative film 11 of the shaped stacked body 20 is performed. This step can be realized by injection molding by inserting the stacked body 20 into a predetermined mold after the printed layer 22 is formed as a binder layer.

Finally, as shown in FIG. 7(*g*), a step of providing the rear base material 24 on the rear surface of the resulting product of FIG. 7(*f*) is performed. For example, in a case where the rear base material 24 is formed of the synthetic resin described above, this step can be realized by injection molding by inserting the resulting product into a predetermined mold after the printed layer 23 is formed as a binder layer.

The side portion of the layer structure of the stacked body 20 is shown in an exposed state in FIGS. 4 and 7, but, in the molding steps of the front base material 21 and the rear base material 24, injection molding can be performed with the resin materials thereof such that both base materials cooperate with each other to enclose the entire stacked body 20. As a result, the stacked body 20 is completely sealed with an outer skin of the resin material.

Effects of Configuration of Emblem for Vehicle

According to the present embodiment, at least the first cushion layer 17 is present between the decorative film 11 and the circuit film 14, and thus the degree of bending of the circuit film 14 when shaping a three-dimensional shape is reduced in comparison with the degree of bending of the decorative film 11. As a result, excessive bending of the heater element of the circuit film 14 is prevented, and breakage or deterioration thereof is prevented. Further, the heater element of the wiring layer 16 of the circuit film 14 can also be protected by arranging the second cushion layer 18 behind the circuit film 14. Furthermore, due to the presence of the second cushion layer 18, it is possible to reduce heat generated by the heater element from escaping to the rear side of the emblem.

Another Configuration Example of Emblem for Vehicle

Figure 8:
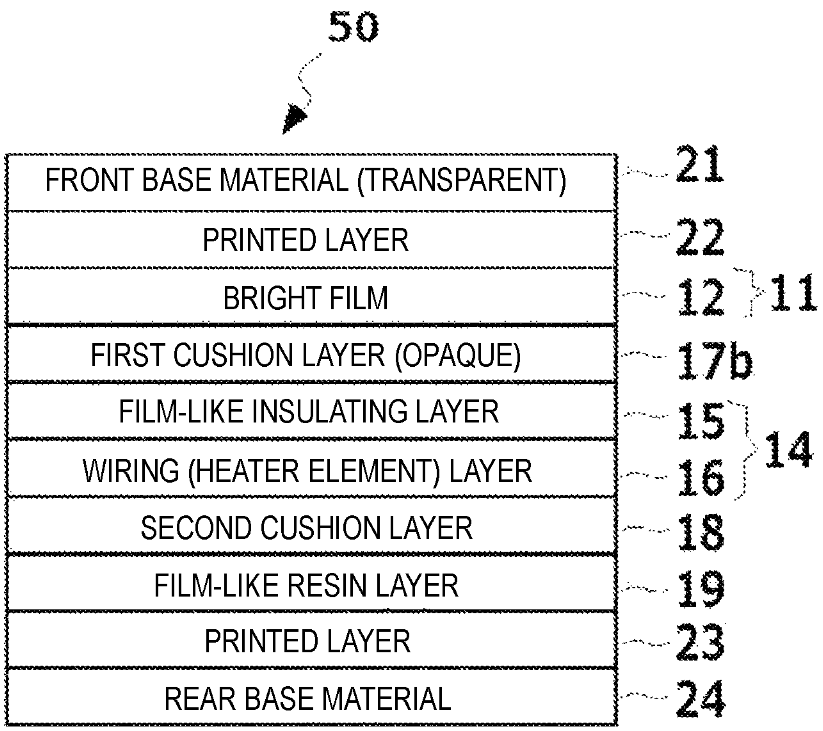
FIG. 8 is a view showing another configuration example of the emblem for a vehicle with a built-in heater according to the present embodiment.

FIG. 8 shows a layered structure of an emblem 50 for a vehicle as another configuration example.

The colored layer (the opaque layer) 13 of the emblem 10 for a vehicle shown in FIG. 1 is described as a layer enhancing a design property of the bright film 12 (and thus the decorative film 11) and preventing the heater element of the wiring layer 16 of the circuit film 14 behind it from being seen through. On the other hand, in a case where the first cushion layer 17*b* itself is a colored layer and the wiring behind it can be prevented from being seen through, the colored layer 13 becomes unnecessary. For this reason, in the emblem 50 for a vehicle, the first cushion layer 17*b* itself is a colored layer, and the colored layer 13 is removed from the layer structure. Other constituent elements of the emblem 50 for a vehicle are the same as those of the emblem 10 for a vehicle.

Modification Example

Although the preferred embodiments of the present invention have been described above, various modifications and changes can be made without departing from the technical scope of the present invention.

Although an example of the shape of the emblem for a vehicle is a circular shape, the shape is not limited to this, and the present invention can be applied to any shape such as an elliptical shape, a square shape, a polygonal shape, and the like.

Although millimeter waves are assumed as radar waves, the present invention does not exclude application to electromagnetic waves in other frequency bands.

Although the cross-sectional shape of the convex portion 35 is shown as a "<" shape, other shapes such as a "[" shape or a "⊂" shape may be used.

The stacked body 20 to be shaped is a stacked body of the decorative film 11, the first cushion layer 17, the circuit film 14, the second cushion layer 18, and the film-like resin layer 19, but the stacked body 20 only has to be a stacked body of at least the decorative film 11, the first cushion layer 17, and the circuit film 14.

Each element mentioned in the above-described embodiment is merely an example and can be changed or replaced with another element as long as the same effect can be obtained. Further, if the effects of the present invention can be obtained even partially by omitting a part of the configuration of the above-described embodiments, such a configuration is also included in the present invention.

The invention claimed is:

1. An emblem for a vehicle with a built-in heater having electromagnetic wave permeability, comprising:

a decorative film;

a circuit film on which a heater element is disposed;

a first adhesive layer disposed between a back surface of the decorative film and a front surface of the circuit film;

a second adhesive layer disposed on a back surface of the circuit film and physically separated from the first adhesive layer, wherein the first adhesive layer and the second adhesive layer are made of a silicone adhesive, a urethane adhesive or an acrylic adhesive;

a transparent front base material disposed on a front surface of the decorative film; and a rear base material disposed on the back surface of the circuit film.

2. The emblem for a vehicle with a built-in heater according to claim 1, wherein the circuit film has a film-like resin member and the heater element disposed on the film-like resin member.

3. The emblem for a vehicle with a built-in heater according to claim 1, wherein a stacked body of at least the decorative film, the first adhesive layer, and the circuit film has a convex portion partially protruding forward from the emblem on a front plane of the emblem.

4. The emblem for a vehicle with a built-in heater according to claim 3, wherein a wiring pattern of the heater element is disposed over substantially the entire area of the circuit film including the inside of an area of the convex portion.

5. The emblem for a vehicle with a built-in heater according to claim 4, wherein the heater element is disposed in a meandering shape at least inside the area of the convex portion.

6. The emblem for a vehicle with a built-in heater according to claim 3, wherein a wiring pattern of the heater element is disposed avoiding an area of the convex portion.

7. The emblem for a vehicle with a built-in heater according to claim 1, wherein a colored layer is provided on the back surface of the decorative film.

8. The emblem for a vehicle with a built-in heater according to claim 1, wherein the first adhesive layer is printed, coated, or dyed in a predetermined opaque color.

9. The emblem for a vehicle with a built-in heater according to claim 1, wherein the second adhesive layer is printed, coated, or dyed in a predetermined opaque color.

10. The emblem for a vehicle with a built-in heater according to claim 1, wherein the rear base material is printed, coated, or dyed in a predetermined opaque color.

11. The emblem for a vehicle with a built-in heater according to claim 1, further comprising a film-like resin layer interposed between the second adhesive layer and the rear base material.

12. The emblem for a vehicle with a built-in heater according to claim 1, wherein the decorative film is constituted by a bright film.

13. The emblem for a vehicle with a built-in heater according to claim 1, wherein the second adhesive layer is thicker than the first adhesive layer.

14. A method for manufacturing an emblem for a vehicle with a built-in heater having electromagnetic wave permeability, comprising:

a step of bonding a front surface of a circuit film having a heater element on a back surface thereof and a back surface of a decorative film to each other with a first cushion layer;

a step of providing a second cushion layer on the back surface of the circuit film;

a step of shaping a stacked body of at least the decorative film, the first cushion layer, and the circuit film, so that the decorative film, the first cushion layer and the circuit film respectively have a convex portion that is partially protruding forward from the emblem on a front plane of the emblem, wherein the shaping is performed by subjecting flat surfaces of the decorative film, the first cushion layer and the circuit film to vacuum molding or air pressure molding so that the flat surfaces of the decorative film, the first cushion layer and the circuit film are shaped to form the convex portion;

a step of providing a transparent resin layer as a front base material on a front surface of the decorative film; and a step of providing a rear base material on a back surface side of the second cushion layer.

15. The method for manufacturing an emblem for a vehicle with a built-in heater according to claim 14, wherein the first and second cushion layers are constituted by an adhesive layer formed of an adhesive.

16. The method for manufacturing an emblem for a vehicle with a built-in heater according to claim 15, further comprising a step of allowing a film-like resin layer to be interposed between the second cushion layer and the rear base material.

* * * * *